United States Patent Office 3,249,574
Patented May 3, 1966

3,249,574
POLYESTER-VINYL MONOMER COMPOSITIONS CONTAINING HYDROGEN PEROXIDE
Heinz W. Meyer, Munich, Germany, assignor to Elektrochemische Werke Munchen Aktiengesellschaft, Bavaria, Germany
No Drawing. Filed Sept. 6, 1961, Ser. No. 136,369
Claims priority, application Germany, Nov. 5, 1957, E 14,888; Aug. 25, 1958, E 16,350
7 Claims. (Cl. 260—30.4)

This is a continuation-in-part of my application, Ser. No. 769,095, filed October 23, 1958, for "Catalyst for Bulk Polymerization," now abandoned.

The present invention relates to a method for the complete curing or hardening of unsaturated polyester resins.

The term "unsaturated polyester resins" as used hereinafter and in the claims annexed hereto indicates mixtures of one or more unsaturated polyesters with one or more unsaturated monomeric components capable of crosslinking therewith. Said unsaturated polyesters are obtained by esterification of unsaturated dicarboxylic acids or their anhydrides with saturated or unsaturated polyols. Such acids, which may be used alone or in mixture with each other, are, for instance, maleic acid, fumaric acid, itaconic acid, and others; they may be replaced, in part, by one or more saturated dicarboxylic acids, such as adipic or succinic acid, or also by aromatic dicarboxylic acids which also may be used alone or in mixture with each other, such as phthalic acid, tetrahydrophthalic acid, and others, or their anhydrides.

Examples of suitable aliphatic polyols, which also may be used alone or in mixture with each other, are ethylene glycol; diethylene glycol (2,2′-dihydroxy ethylether); triethylene glycol (ethyleneglycol-bis-[2-hydroxy ethylether]; propanediol-1,2; butanediol-1,3; 2,2-dimethylpropanediol-1,3; butene (2)-diol-1,4; and others.

The acids as well as the alcohols may be substituted, for instance halogenated. Examples of such halogenated acids are tetrachlorophthalic acid; 1,4,5,6,7,7-hexachlorobicyclo(2,2,1)-heptenic(5)-2,3,-dicarboxylic acid; and others, or their anhydrides.

As monomers capable of crosslinking with said unsaturated polyesters, I may use styrene, vinyl toluene, methylmethacrylate, diallyl phthalate, dibutyl fumarate, acrylonitrile, triallyl cyanurate, and others.

Heretofore, organic peroxides have been used as catalysts for curing the recited unsaturated polyester resins. Though aqueous hydrogen peroxide solutions are employed as catalysts for emulsion and suspension polymerization, they are unsuitable for curing unsaturated polyester resins because the water of the solutions interferes with the curing action and affects the properties of the cured resins. Anhydrous or substantially anhydrous hydrogen peroxide might be suitable for the cure of unsaturated polyester resins; however, it is not being used because it is expensive and because its manipulation would be too difficult and too dangerous for this purpose.

The principal object of the invention is to provide a process for curing unsaturated polyester resins by means of hydrogen peroxide in a form which is readily and economically prepared and which can be handled without risk.

It is another object of the invention to provide a curing process with hydrogen peroxide which gives at least as good results as the curing methods with organic peroxides and which yields products having excellent properties.

Other objects and advantages will be apparent from a consideration of the specification and claims.

The above objects are accomplished by using, as curing catalysts for unsaturated polyester resins, high concentrated hydrogen peroxide solutions in suitable organic solvents.

Suitable organic solvents are liquid organic compounds, or mixtures thereof, which have good dissolving power for hydrogen peroxide, do not react therewith, and have no decomposing effect on hydrogen peroxide; they must not interfere with the curing procedure and must be compatible with unsaturated polyester resins. As a hydrogen peroxide may be used which contains some water, the solvents should have a certain solubility for water.

Solvents satisfying the recited conditions are aliphatic or alicyclic ethers having uninterrupted carbon chains of not more than 4 C atoms, such as diethyl ether, diisopropyl ether, tetrahydrofurane, dioxane, diethyl carbitol (2,2-diethoxy diethyl ether), and esters of monohydric or polyhydric alcohols which may contain any number of carbon atoms but not more than 4 such atoms in an uninterrupted chain, with acids such as saturated aliphatic monocarboxylic acids having 1–4 C atoms, aliphatic dicarboxylic acids having 2–10 C atoms, alicyclic and aromatic monocarboxylic and polycarboxylic acids having up to 10 C atoms, phosphoric acid, and carbonic acid. In addition to the lower aliphatic alcohols, ether alcohols, whose hydrocarbon chains of not more than 4 C atoms are separated by oxygen atoms, are suitable to form the recited esters. Such ether alcohols include also alcohols containing two or more ether linkages as represented, for instance, by the formula

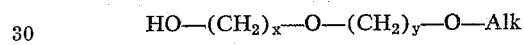

$$HO-(CH_2)_x-O-(CH_2)_y-O-Alk$$

wherein x and y are integers between 1 and 4 and alkyl is a lower alkyl containing not more than 4 C atoms.

Examples of such esters are acetate, beta-ethoxyethyl acetate, beta-ethoxyethyl propionate, beta-ethoxymethyl propionate, glycol diacetate, glycerol triacetate, diethyl oxalate, ethyl butyl succinate, diethyl adipate, methyl ethyl adipate, dimethyl sebacate, acetyltriethyl citrate, dimethyl phthalate, dimethylglycol phthalate, isophthalic acid diethyl ester, triethyl phosphate, tributyl phosphate, tributoxy ethyl phosphate, diethyl carbonate, propylene carbonate, and others.

The use of easily volatile ethers as solvent is of advantage when the hydrogen peroxide solution is used to cure thin layers of unsaturated polyester resins, as for instance in the curing of unsaturated polyester resin lacquers.

The high concentrated hydrogen peroxide used for the preparation of the solution must have a concentration of at least 70 percent of $H_2O_2$ by weight, preferably 85 percent and more by weight. Said hydrogen peroxide is dissolved in the solvents to solutions of about 10 to 25 percent by weight of $H_2O_2$, which concentration may be increased, if desired, to 50 percent by weight.

The hydrogen peroxide solutions of the invention may be used as catalysts for the hardening or curing of the unsaturated polyester resins as such or they may contain conventional organic peroxide catalysts in amounts of about 10 to 90 percent by weight, calculated on the total peroxide catalyst. Such catalysts are, for instance, methylethylketone peroxide, cyclohexanone peroxides, tert. butylhydroperoxide, cumene hydroperoxide, hydroxyheptylperoxide, dibenzaldiperoxide, di-tert. butylperoxide, tert. butylperbenzoate, tert. butylperacetate, 2,2-bis-(tert.-butylperoxide)-butane, benzoylperoxide, lauroylperoxide, and others.

Said hydrogen peroxide solutions and the recited organic peroxides, or their solutions or pastes, may also be added separately, in whatever sequence, to the unsaturated polyester resins to be cured.

In order to cure unsaturated polyesters in accordance with the process of the invention, the recited solutions of hydrogen peroxide, or of hydrogen peroxide and organic peroxides, are added in a total amount of 0.1 to 5 percent by weight of the resin, and the resulting mixture is heated to a temperature of at least 50° C. up to about 120° C., whereupon curing starts quickly with a development of heat which may raise the temperature without external heat supply to about 200° C. and is soon terminated. If the hydrogen peroxide solution, and the organic peroxides or their solutions, are added separately to the resin, such amounts are used that the sum of the additions is 0.1 to 5 percent by weight of the resin and the resulting mixture is also heated to at least 50° C. whereupon complete cure is quickly obtained. The rate of curing may be controlled by adjusting the ratio of hydrogen peroxide to the organic peroxides; a considerable increase in the rate of cure is readily obtained when only 10 percent of a conventional organic peroxide catalyst is replaced by the novel hydrogen peroxide catalyst of the invention. In other words, improved results were readily obtained by the use of peroxide catalysts consisting of about 90 percent of a conventional peroxide catalyst and only 10 percent of an organic concentrated hydrogen peroxide solution.

In another embodiment of the invention, solutions of metal compounds conventionally used as curing catalysts are added in addition to the peroxide catalysts. Suitable metal compounds are, for instance, inorganic or organic salts of cobalt, manganese, vanadium, such as cobalt naphthenate, cobalt octoate, manganese naphthenate, manganese octoate, vanadium p-toluenesulfonate, vanadium chloride, vanadium acetate, vanadium octoate, vanadyl acetylacetonate, and others.

Said metal compounds are added in form of solutions which contain preferably about 1 percent by weight of the respective metal, calculated on the weight of the solution, and 0.01 to 3 percent by weight of the respective solution are added, based on the weight of resin to be cured. As a rule, so much metal compound should be added that the resin contains about 0.001 to 0.03 percent by weight of the accelerator, calculated as metal. The curing starts then mostly at room temperature, that is at a temperature of about 10 to 30° C., or by heating at slightly elevated temperatures, for instance 45° C. but not exceeding about 100° C.

The temperature at which curing starts, and the rate of curing depend not only on the kind and amount of the additions but also on the composition of the polyester resin to be cured.

The invention is further illustrated, but not limited, by the following examples. All parts and percentages are given by weight unless indicated otherwise.

EXAMPLE 1

The following unsaturated polyester resins were prepared—

Unsaturated polyester resin A:
4.4 moles of propanediol-1,2 were esterified after addition of 0.18 part of tri (2-chloroethyl) phosphite and 0.005 part of hydroquinone (based on the weight of the batch) with two moles of maleic anhydride and 2 moles of tetrachlorophthalic anhydride, for a period of 6 hours at a temperature of 170–210° C.

70 parts of the obtained unsaturated polyester were mixed with 30 parts of vinyl toluene and 0.005 part of hydroquinone were added to the mixture. The thus obtained liquid unsaturated polyester resin had an acid number of 26.

Unsaturated polyester resin B:
4.2 moles of diethylene glycol (2,2'-dihydroxy-diethyl ether) are esterified for a period of 6 hours at a temperature of 160 to 220° C. with 2.6 moles of maleic anhydride and 1.3 moles of phthalic anhydride.

70 parts of the obtained unsaturated polyester were mixed with 30 parts of styrene, and 0.01 part of hydroquinone were added to the mixture. The thus obtained liquid unsaturated polyester resin had an acid number of 4.5.

Unsaturated polyester resin C:
After addition of 0.22 part of 2-ethylhexyl octylphenyl phosphite and 0.005 part of hydroquinone (calculated on the weight of the batch), 2.2 moles of propanediol-1,2 and 2.2 moles of butanediol-1,3 were esterified for a period of 6 hours with 3 moles of tetrahydrophthalic anhydride and 1 mole of maleic anhydride at a temperature of 180 to 210° C.

70 parts of the thus obtained unsaturated polyester were mixed with 30 parts of styrene, and 0.005 part of hydroquinone were added to the mixture. The thus obtained unsaturated polyester resin had an acid number of 29.

Unsaturated polyester resin D:
2.2 moles of butanediol-1,3 and 2.2 moles of triethylene glycol (ethyleneglycol-bis-2-hydroxyethylether) were esterified, after addition of 0.22 part of tris-(2-chloroethyl)-phosphite and 0.005 part of hydroquinone (calculated on the weight of the batch) with 4 moles of maleic anhydride at a temperature of 170°–210° C. for a period of 6½ hours.

70 parts of the thus obtained unsaturated polyester were mixed with 30 parts of triallyl cyanurate, and 0.005 part of hydroquinone were added to the mixture. The obtained liquid unsaturated polyester resin had an acid number of 30.

Unsaturated polyester resin E:
4.34 moles of diethylene glycol (2,2'-dihydroxy diethylether) were esterified, after addition of 0.22 part of tris-(2-chloroethyl) phosphite and 0.005 part of hydroquinone (calculated on the weight of the batch) with 2.7 moles of fumaric acid and 1.3 moles of succinic anhydride for 6 hours at 150–210° C.

70 parts of the obtained unsaturated polyester were diluted with 30 parts of diallyl phthalate, and 0.005% of hydroquinone were added to the mixture. The thus obtained polyester resin had an acid number of 20.

Unsaturated polyester resin F:
4.4 moles of butanediol-1,3 were esterified, after addition of 0.24 part of triphenyl phosphite and 0.005 percent of hyroquinone (calculated on the weight of the batch), with 2.6 moles of maleic anhydride and 1.3 moles of tetrahydrophthalic anhydride for a period of 7 hours at a temperature of 170–210° C.

70 parts of the obtained unsaturated polyester were mixed with 30 parts of styrene and 0.005 part of hydroquinone. The thus obtained liquid unsaturated polyester resin had an acid number of 25.

Unsaturated polyester resin G:
4.4 parts of butanediol-1,3 were esterified, after addition of 0.25 part of triphenyl phosphite of 0.005 percent of hydroquinone (calculated on the weight of the batch) with 4 moles of maleic anhydride for 6½ hours at 170–210° C.

70 parts of the obtained unsaturated polyester were mixed with 30 parts of styrene and 0.005 part of hydroquinone. The thus obtained liquid unsaturated polyester resin had an acid number of 26.

Unsaturated polyester resin H:
After addition of 0.21 part of triphenyl phosphite and 0.005 part of hydroquinone (calculated on the weight of the batch), 4.2 moles of diethylene glycol (2,2'-dihydroxy diethylether) were esterfied with 2 moles of maleic anhydride and 2 moles of phthalic anhydride for 7 hours at 180–220° C.

70 parts of the obtained unsaturated polyester were mixed with 30 parts of styrene and 0.005 part of hydroquinone. The thus obtained liquid polyester resin had an acid number of 36.

The following solutions of high concentrated hydrogen peroxide in suitable organic solvents were prepared, which all were excellent catalysts for the curing of unsaturated polyester resins.

$H_2O_2$ solution 1:

25 parts of an aqueous hydrogen peroxide solution containing 80% of $H_2O_2$ were added at room temperature with stirring slowly to 75 parts of triethyl phosphate. A heat development is observed; its cause is not fully understood but it can be easily controlled by cooling. There was obtained a stable solution of hydrogen peroxide in triethyl phosphate containing about 20 percent of $H_2O_2$.

$H_2O_2$ solution 2:

21 parts of an aqeuous hydrogen peroxide solution containing 95 percent of $H_2O_2$ were added at room temperature with stirring and cooling slowly to 79 parts of dimethyl phthalate. There was obtained a stable solution of hydrogen peroxide in dimethyl phthalate containing about 20 percent of $H_2O_2$.

$H_2O_2$ solution 3:

22 parts of an aqueous hydrogen peroxide solution containing 90 percent of $H_2O_2$ were slowly added at room temperature with stirring and under cooling to 78 parts of di-(beta-methoxyethyl) phthalate. There was obtained a stable solution of hydrogen peroxide in dimethylglycol phthalate containing about 20 percent of $H_2O_2$.

$H_2O_2$ solution 4:

17.5 parts of an aqueous hydrogen peroxide solution containing 86 percent of $H_2O_2$ were added slowly at room temperature with stirring and cooling to 82.5 parts of beta-ethoxyethyl acetate. There was obtained a solution of hydrogen peroxide in beta-ethoxyethyl acetate containing about 15 percent of $H_2O_2$.

$H_2O_2$ solution 5:

17.7 parts of an aqueous hydrogen peroxide solution containing 85 percent of $H_2O_2$ were slowly added at room temperature with stirring and under cooling to 82.3 parts of diethyl carbitol (2,2'-diethoxy diethylether). There was obtained a solution of hydrogen peroxide in diethyl carbitol containing about 15 percent of $H_2O_2$.

$H_2O_2$ solution 6:

17 parts of an aqeuous hydrogen peroxide solution containing 90 percent of $H_2O_2$ were slowly added at room temperature with stirring under cooling to 83 parts of diethyl carbonate. There was obtained a solution of hydrogen peroxide in diethyl carbonate containing about 15 percent of $H_2O_2$.

$H_2O_2$ solution 7:

35 parts of an aqueous hydrogen peroxide solution containing 85 percent of $H_2O_2$ were slowly added at room temperature with stirring under cooling to 65 parts of ethyleneglycol diacetate. There was obtained a solution of hydrogen peroxide in ethyleneglycol diacetate containing about 30 percent of $H_2O_2$.

$H_2O_2$ solution 8:

17 parts of an aqueous hydrogen peroxide solution containing 90 percent of $H_2O_2$ were slowly added at room temperature with stirring under cooling to 83 parts of beta ethoxyethyl propionate. There was obtained a solution of hydrogen peroxide in beta ethoxyethyl propionate containing about 15 percent of $H_2O_2$.

The thus prepared unsaturated polyester resins and hydrogen peroxide solutions were used for curing tests. The results are given on Table 1.

The tests were made by mixing 50 g. of the respective unsaturated polyester resin with the recited amount of hydrogen peroxide solution in a thin-walled beaker. The beaker containing the mixture was placed in a bath of constant temperature, and the time was measured after which gelation of the mass took place. At the same time, the temperature of the curing unsaturated polyester resin was measured by means of a thermocouple as a function of time, and the period of time was determined after which the temperature had risen to a maximum (peak time).

The obtained shaped bodies were fully cured and clear and transparent.

In the following tables, the first column indicates the unsaturated polyesterd resin employed, the second column the composition and amount of the used $H_2O_2$ solution, calculated on the unsaturated polyester resin. The third column indicates the bath temperature. The fourth column indicates the time (in minutes) required for gelation, and the last column gives the time (in minutes) required to reach the peak of the exothermal temperature rise.

Table 1

| Test No. | Resin | $H_2O_2$ solution | Bath temperature, °C. | Gel time, minutes | Peak time, minutes |
|---|---|---|---|---|---|
| 1 | A | 1.5% soln. 1 | 60 | 7 | 48 |
| 2 | G | 3% soln. 4 | 80 | 14 | 30 |
| 3 | B | 0.75% soln. 1 | 100 | 8 | 14 |
| 4 | C | 3% soln. 5 | 100 | 6 | 16 |
| 5 | F | 2% soln. 5 | 100 | 7 | 15 |

EXAMPLE 2

For this series of tests, the same unsaturated polyester resins and the same hydrogen peroxide solutions were used as in Example 1. Also the procedure was the same as set forth in Example 1, except that, before or after the introduction of the hydrogen peroxide solution, solutions of metal accelerators in the recited amounts were incorporated in the unsaturated polyester resin, and the cure was carried out, in part, at room temperature. The term "room temperature" in the following Table 2 indicates that the beaker containing the reaction mixture was not placed in a bath but left to stand at room temperautre.

The following solutions of metal accelerators were used:

Cobalt accelerator: Solution of cobalt octoate in styrene; metal content 1%.

Manganese accelerator: Solution of manganese octoate in styrene; metal content 1%.

Vanadium accelerator: Solution of vanadyl para toluene sulfonate in a mixture of 8 parts of xylene and 2 parts of isopropanol; metal content 1%.

The results are shown in Table 2, where the columns are similar to the columns of Table 1. The "metal" column lists the amount of accelerator solution in percent by weight, based on the weight of the resin. For instance, 0.3% Co indicates that 0.3 percent, calculated on the weight of the resin, of the cobalt octoate solution defined above was added. The obtained plastics were fully cured, clear and transparent, and had a pale yellowish to soft pinkish color.

Table 2

| Test No. | Resin | $H_2O_2$ solution | Metal | Bath temp. | Gel time, minutes | Peak time, minutes |
|---|---|---|---|---|---|---|
| 1 | A | 2% soln. 3 | 0.3% Co | Room | 33 | 82 |
| 2 | B | 0.75% soln. 1 | 1% Co | do | 3 | 33 |
| 3 | C | 2% soln. 3 | 1% Co | do | 9 | 26 |
| 4 | D | 3% soln. 3 | 1% Co | do | 12 | 180 |
| 5 | F | 1.5% soln. 5 | 0.5% Co | do | 6 | 26 |
| 6 | H | 1.5% soln. 4 | 0.2% Vd | do | 13 | 19 |
| 7 | B | 1% soln. 3 | 0.1% Mn | 60° C | 14 | 28 |
| 8 | E | 1.5% soln. 1 | 0.3% Co | 100° C | 10 | 47 |
| 9 | D | 1% soln. 3 | 0.5% Co | 100° C | 5 | 12 |
| 10 | G | 2% soln. 6 | 1% Co | Room | 3 | 9 |

EXAMPLE 3

The following catalyst solutions were prepared—

Catalyst solution 1:

1 part of a 40% solution of methylethylketone peroxide in dimethyl phthalate was added with stirring at room temperature to 1 part of the hydrogen peroxide solution 4 of Example 1. A stable solution was obtained which was an excellent catalyst for the cure of unsaturated polyester.

Catalyst solution 2:

1 part of di-tert.-butylperoxide was added with stirring at room temperature to 3 parts of the hydrogen peroxide solution 4 of Example 1. There was obtained a stable solution which was an excellent catalyst for curing unsaturated polyester resins.

Said catalyst solutions were used instead of the hydrogen peroxide solutions of Example 1 to cure polyester resins as set forth in Example 1. The results are given in Table 3. The obtained resins were fully cured and clear and transparent.

*Table 3*

| Test No. | Resin | Catalyst | Bath Temperature, °C. | Gel time, minutes | Peak time, minutes |
|---|---|---|---|---|---|
| 1 | H | 2% soln. 1 | 60 | 16 | 38 |
| 2 | F | 1.5% soln. 2 | 100 | 13 | 16 |

EXAMPLE 4

The following stable solutions were prepared which were excellent catalysts for the cure of unsaturated polyester resins:

Catalyst solution 3:

1 part of a 70% cumene hydroperoxide solution was added with stirring at room temperature to 3 parts of hydrogen peroxide solution 1 of Example 1.

Catalyst solution 4:

1 part of a 50% tert. butylperacetate solution in dimethyl phthalate was added at room temperature with stirring to 1 part of the hydrogen peroxide solution 2 of Example 1.

Catalyst solution 5:

2 parts of a 50% solution of tert. butyl peracetate in dimethyl phthalate were added at room temperature with stirring to 1 part of the hydrogen peroxide solution 2 of Example 1.

The above described catalyst solutions were used to cure unsaturated polyester resins of Example 1, whereby the cure was carried out as set forth in Example 2, using the above catalyst solutions instead of the hydrogen peroxide solutions of said example.

The results are given in Table 4. The obtained plastics were fully cured and completely clear and transparent. They were tinted a pale yellow to soft pink.

*Table 4*

| Test No. | Resin | Catalyst | Accelerator | Bath temp. | Gel time, minutes | Peak time, minutes |
|---|---|---|---|---|---|---|
| 1 | H | 2% soln. 3 | 1% Co | Room | 5 | 11 |
| 2 | F | 2% soln. 4 | 0.4% Vd | do | 6 | 11 |
| 3 | G | 1.5% soln. 5 | 0.2% Mn | 60° C | 23 | 56 |

EXAMPLE 5

Hydrogen peroxide solutions as described in Example 1 and various organic peroxides were added to 50 g. each of the unsaturated polyester resin described in Example 1.

In addition, the metal accelerators of Example 2 were added under the conditions set forth in said example.

The results are given in Table 5. The obtained resins were fully hardened, aesthetically pleasing and had a soft pinkish to pale yellowish color.

*Table 5*

| Test No. | Resin | $H_2O_2$ solution | Organic peroxide | Accelerator | Bath temp. | Gel time, minutes | Peak time, min. |
|---|---|---|---|---|---|---|---|
| 1 | F | 1% soln. 4 | a | 0.5% Co | Room | 6 | 19 |
| 2 | G | 2% soln. 2 | b | 1% Co | do | 6 | 10 |
| 3 | F | 2% soln. 5 | c | 1% Co | do | 6 | 48 |
| 4 | F | 1% soln. 2 | d | 0.2% Co | 60° C | 3 | 6 |
| 5 | G | 1% soln. 4 | e | | 100° C | 2 | 3 |

The amounts, based on the weight of the resins, and compositions of the organic peroxide solutions, were as follows:

$a$ = 0.5% of a 40% methyl ethyl ketone peroxide solution;
$b$ = 0.5% of a 50% cyclohexanone peroxide solution;
$c$ = 1% of a 70% cumene hydroperoxide solution;
$d$ = 0.5% of an 80% tert-butylperoctoate solution;
$e$ = 1% of a 50% benzoylperoxide paste.

EXAMPLE 6

To 100 parts of unsaturated polyester resin A of Example 1, there were added 1.5 parts of the hydrogen peroxide solution 3 of Example 1 and 0.2 part of the cobalt accelerator of Example 2. The mixture was poured into a mold and allowed to cure at room temperature.

The cured sheet of 10 mm. thickness was port-cured for 1 hour at 120° C. to a clear transparent, hard, pale yellowish resin; samples taken from the resin sheet were tested for flexural strength according to the German testing procedure DIN 53 452 and for the dielectric loss factor according to DIN 53 483.

Flexural strength: 400 kg./cm.$^2$

Loss factor $tg\delta = 6.0 \times 10^{-3}$

EXAMPLE 7

100 parts of the unsaturated polyester resin A of Example 1 were mixed with 1 part of the hydrogen peroxide solution 3 of Example 1 and 0.3 part of the cobalt accelerator of Example 2. 15 layers of the woven glass fabric placed upon each other cross-wise, having a number of filaments 6.5 x 6.5 per cm. and a weight of 410 g. per cm. and provided with a silane finish, were impregnated with said mixture in such proportions that the mass consisted of 35 parts of glass fibers and 65 parts of unsaturated polyester resin; the thus formed laminated structure was allowed to cure at room temperature, and the obtained block was heated for 1 hour at 120° C.

Test samples were taken to measure the flexural strength according to the method of DIN 53 452. The flexural strength was 2700 kg/cm$^2$.

EXAMPLE 8

This and the following examples are given to show the advantages of replacing even minor amounts of an organic peroxide catalyst by hydrogen peroxide dissolved in an organic solvent.

3 parts of ditert. butyl peroxide were added to 100 parts of the unsaturated polyester resin G, and the mixture was heated at 80° C. After a heating period of 2 hours, the batch was still liquid.

If, instead of 3 parts of ditert. butyl peroxide, 2.7 parts thereof were used with 0.3 part of $H_2O_2$ solution 3, the resin was completely cured readily after 31 minutes of heating at 80° C.

EXAMPLE 9

1.5 parts of a 50% cyclohexanone peroxide solution and 0.5 part of the cobalt accelerator of Example 2 were added to 100 parts of the unsaturated polyester resin G, and the mixture was allowed to stand at 23° C. It took 80 minutes to obtain complete curing.

If the test were repeated under the same conditions with the sole exception that, instead of 1.5 parts of a 50% cyclohexanone peroxide solution, 1.35 parts of said solution and 0.15 part of the hydrogen peroxide solution 3 were used, the resin was completely cured after 25 minutes.

I claim:

1. A process which comprises copolymerizing an unsaturated polyester resin prepared by reacting a polyhydric alcohol with a member of the group consisting of alpha, beta ethylenically unsaturated dicarboxylic acids and anhydrides thereof, with a liquid monomer containing a $CH_2=C<$ group in admixture with 0.1 to 5 percent, based on the combined weight of said polyester and monomer, of a peroxide polymerization catalyst comprising a hydrogen peroxide solution containing about 10 to 50 percent by weight of $H_2O_2$ in a solvent selected from the group consisting of ethers whose oxygen-linked hydrocarbon groups are uninterrupted hydrocarbon chains of not more than 4 carbon atoms, esters of lower aliphatic alcohols, and esters of ether alcohols, the oxygen-linked hydrocarbon groups of said ether alcohols being uninterrupted hydrocarbon chains having not more than 4 carbon atoms, both said esters of said alcohols and said ether alcohols being esters of an acid selected from the group consisting of aliphatic monocarboxylic acids containing 1–4 C atoms, aliphatic dicarboyxlic acids, alicyclic and aromatic carboxylic acids, phosphoric acid, carbonic acid, and mixtures thereof, said monomer being substantially the only solvent for said polyester resin.

2. The process according to claim 1 wherein the reaction mixture is heated to at least 50° C. to start the exothermic curing reaction.

3. The process according to claim 1 wherein said polymerization catalyst contains about 10 to 90 percent of said hydrogen peroxide solution, the balance being essentially an organic peroxide catalyst.

4. The process according to claim 1 wherein the reaction is carried out in additional admixture with 0.001 to 0.03 percent by weight of a metal accelerator selected from the group consisting of cobalt, manganese, and vanadium, incorporated in form of an organic salt.

5. The process according to claim 4 wherein the reaction is started at a temperature of about 10 to 35° C.

6. The process according to claim 4 wherein the reaction mixture is heated to at least 45° C. to start the exothermic curing reaction.

7. A process which comprises copolymerizing an unsaturated polyester resin prepared by reacting a polyhydric alcohol with a member of the group consisting of alpha, beta ethylenically unsaturated dicarboxylic acids and anhydrides thereof, with a liquid monomer containing a $CH_2=C<$ group in admixture, both said esters of said alcohols and said ether alcohols being esters of 0.1 to 5 percent, based on the combined weight of said polyester and monomer, of a peroxide catalyst consisting of about 10 to 90 percent by weight of an organic peroxide polymerization catalyst and of about 90 to 10 percent of a hydrogen peroxide solution, said solution containing about 10 to 50 percent by weight of $H_2O_2$ in a solvent selected from the group consisting of ethers whose oxygen-linked hydrocarbon groups are uninterrupted hydrocarbon chains of not more than 4 carbon atoms, esters of lower aliphatic alcohols, and esters of ether alcohols whose oxygen-linked hydrocarbon groups are uninterrupted hydrocarbon chains having not more than 4 carbon atoms, with an acid selected from the group consisting of aliphatic monocarboxylic acids containing 1–4 C atoms, aliphatic dicarboxylic acids, alicyclic and aromatic carboxylic acids, phosphoric acid, carbonic acid, and mixtures thereof, and in further admixture with 0.001 to 0.03 percent by weight of a metal accelerator selected from the group consisting of cobalt, manganese, and vanadium, incorporated in form of an organic salt, said monomer being substantially the only solvent for said polyester resin.

References Cited by the Examiner

UNITED STATES PATENTS

| | | | |
|---|---|---|---|
| 2,195,362 | 3/1940 | Ellis | 260—861 |
| 2,373,527 | 4/1945 | Agens | 260—45.4 |
| 2,851,379 | 9/1958 | Staudinger et al. | 260—45.4 |
| 2,904,533 | 9/1959 | Carlston | 260—861 |
| 2,965,602 | 12/1960 | Hicks | 260—45.4 |

MORRIS LIEBMAN, *Primary Examiner.*

LEON BERCOVITZ, *Examiner*